United States Patent
Lu et al.

(10) Patent No.: US 9,542,258 B1
(45) Date of Patent: Jan. 10, 2017

(54) SYSTEM AND METHOD FOR ERROR-MINIMIZING VOLTAGE THRESHOLD SELECTION

(71) Applicant: Western Digital Technologies, Inc., Irvine, CA (US)

(72) Inventors: Guangming Lu, Irvine, CA (US); Dengtao Zhao, Santa Clara, CA (US)

(73) Assignee: Western Digital Technologies, Inc., Irvine, CA (US)

(*) Notice: Subject to any disclaimer, the term of this patent is extended or adjusted under 35 U.S.C. 154(b) by 209 days.

(21) Appl. No.: 13/842,771

(22) Filed: Mar. 15, 2013

(51) Int. Cl.
- G06F 11/00 (2006.01)
- G06F 11/10 (2006.01)
- G11C 29/00 (2006.01)
- G06F 11/07 (2006.01)

(52) U.S. Cl.
CPC ............ G06F 11/0793 (2013.01); G06F 11/10 (2013.01)

(58) Field of Classification Search
None
See application file for complete search history.

(56) References Cited

U.S. PATENT DOCUMENTS

| | | | |
|---|---|---|---|
| 5,299,162 A | 3/1994 | Kim et al. | |
| 7,558,109 B2 | 7/2009 | Brandman et al. | |
| 7,805,663 B2 | 9/2010 | Brandman et al. | |
| 7,904,793 B2 | 3/2011 | Mokhlesi et al. | |
| 8,156,398 B2 | 4/2012 | Sommer | |
| 8,156,403 B2 | 4/2012 | Shalvi et al. | |
| 8,243,514 B2 | 8/2012 | Kang et al. | |
| 8,351,258 B1* | 1/2013 | Yang et al. | G11C 11/5642 365/185.03 |
| 2011/0191652 A1 | 8/2011 | Dave et al. | |
| 2012/0063227 A1 | 3/2012 | Weingarten et al. | |
| 2012/0236638 A1 | 9/2012 | Weingarten et al. | |
| 2013/0159796 A1* | 6/2013 | Bedeschi | 714/708 |
| 2014/0026003 A1* | 1/2014 | Chen et al. | 714/708 |
| 2014/0068365 A1* | 3/2014 | Chen et al. | 714/746 |
| 2014/0258796 A1* | 9/2014 | Ghaly et al. | 714/708 |
| 2014/0359202 A1* | 12/2014 | Sun et al. | 711/103 |

\* cited by examiner

*Primary Examiner* — Justin R Knapp
(74) *Attorney, Agent, or Firm* — McDermott Will & Emery LLP

(57) ABSTRACT

Embodiments of solid-state storage devices provided herein include a voltage threshold calculation mechanism to calculate an optimal voltage read threshold for minimizing read errors. The system may be configured to determine optimal reference voltage value(s) by interpolating a pair of reads at two different threshold levels to determine the point that generates the least number of errors. In some cases, the evaluation may be an approximation based on a Cumulative Distribution Function (CDF) of errors of a first type and a second type. In other cases, the evaluation may be a calculation of an optimal voltage threshold based on the CDF of the errors. In yet other cases, the evaluation may be based on the Probability Density Function (PDF) of the errors.

27 Claims, 9 Drawing Sheets

SYSTEM AND METHOD FOR ERROR-MINIMIZING VOLTAGE THRESHOLD SELECTION

BACKGROUND

Technical Field

This disclosure relates to non-volatile storage subsystems, including but not limited to flash drives. More particularly, the disclosure relates to systems and methods for an enhanced data recovery method for solid state storage devices.

Description of the Related Art

Flash memory devices store information in an array of memory cells constructed with floating gate transistors. In single-level cell (SLC) flash devices, each cell stores a single bit of information. In multi-level cell (MLC) devices, each cell stores two or more bits of information. When a read operation is performed, the electrical charge levels of the cells are compared to one or more voltage reference values (also called "voltage thresholds" or "threshold levels") to determine the state of each cell. In SLC devices, each cell is read using a single voltage reference value. In MLC devices, each cell is read using multiple voltage references values. Some flash devices implement commands for enabling an external memory controller to set the voltage reference values.

Various factors can contribute to data read errors in flash memory devices. These factors include charge loss or leakage over time, and device wear caused by usage. When the number of bit errors on a read operation exceeds the ECC (error correction code) correction's capability of the storage subsystem, the read operation fails.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

Overview

Some embodiments of solid-state storage devices provided herein include a voltage threshold calculation mechanism to calculate an optimal voltage read threshold for minimizing read errors. In various embodiments, the system is configured to determine optimal reference voltage value (s) by interpolating a pair of reads at two different threshold levels to determine the point that generates the least number of errors. In some cases, the evaluation may be an approximation based on a Cumulative Distribution Function (CDF) of errors of a first type and a second type. Typically, the first type may include bits that were incorrectly read as a 0 instead of a 1 and the second type may include bits that were incorrectly read as a 1 instead of a 0. However, the error types are not limited as such and can include any read error where one value is incorrectly read as a second value. In other cases, the evaluation may be a calculation of an optimal voltage threshold based on the CDF of the errors. In yet other cases, the evaluation may be based on the Probability Density Function (PDF) of the errors.

System Overview

Figure 1:
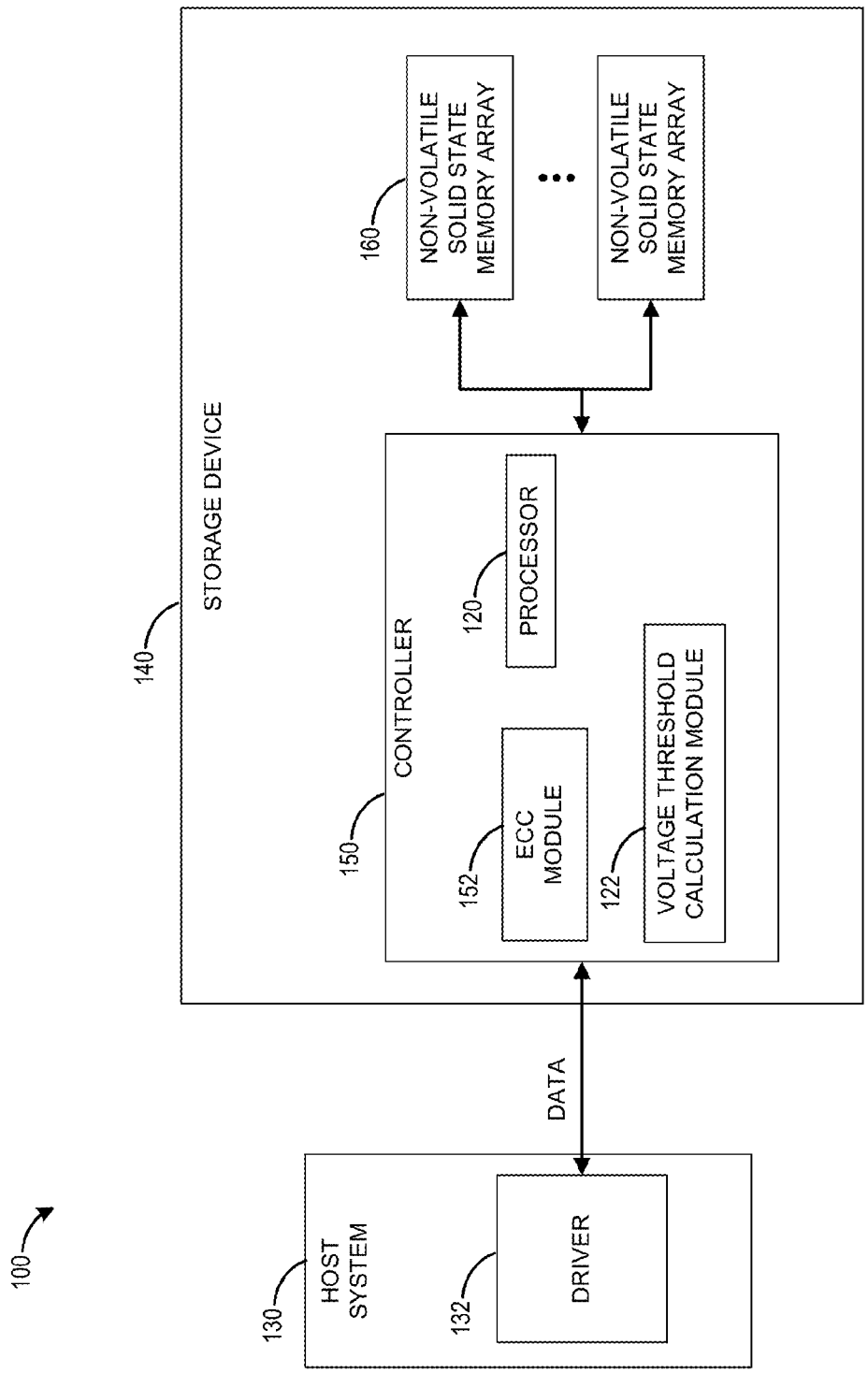
FIG. 1 is a block diagram illustrating an example of a storage device that implements an error-minimizing voltage threshold selection scheme.

FIG. 1 is a block diagram illustrating a storage device 140 implementing an error-minimizing voltage threshold selection scheme according to one embodiment. As shown, a storage subsystem/device 140 includes a controller 150 and one or more non-volatile solid-state memory arrays 160. The controller 150, in some embodiments, includes an ECC (error correction code) module 152, a processor 120, and a voltage threshold calculation module 122. In other embodiments, the modules may be separated into additional modules or combined into one module. In one embodiment, the processor 120 of the controller 150 may perform error-minimizing voltage threshold determination processes for determining a voltage-threshold for the storage device as further described below. Advantageously, in certain embodiments, by using the processor 120, the voltage threshold determination processes may be performed without the addition of additional hardware.

In some embodiments, the voltage threshold calculation module 122 is configured to execute error-minimizing voltage threshold determination processes for determining a voltage-threshold for the storage device as further described below. Advantageously, in certain embodiments, by using the voltage threshold calculation module 122 to perform the voltage threshold determination processes, the processor 120 is free to perform other functions for the storage device 120, such determining read and write ordering. Further, in some cases, the voltage threshold calculation module 122 may be configured to perform the error-minimizing voltage threshold determination processes more efficiently and/or using less power than the processor 120 of the controller 150.

In one embodiment, the controller 150 of the storage device 140 is configured to receive and execute commands from a device driver 132 in a host system 130. The memory commands from the driver 132 may include write and read commands issued by the host system 130. As further shown in FIG. 1, in one embodiment, the controller 150 executes the received commands in one or more non-volatile solid-state memory arrays 160. The arrays may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips. The solid state storage devices may be physically divided into blocks, pages and sectors, as is known in the art. Other forms of storage (e.g., battery backed-up volatile DRAM or SRAM devices, magnetic disk drives, etc.) may additionally or alternatively be used.

Typically, the non-volatile solid-state memory arrays 160 may be programmed with different voltage thresholds. The voltage thresholds may be used to determine whether a memory cell is in a first state or a second state. For example, the voltage stored in a cell of the non-volatile solid state memory array 160 may be compared against the voltage threshold to determine whether the voltage stored in the cell represents the first state (e.g., '0') or the second state (e.g., '1'). In some cases, the voltage threshold for a non-volatile solid-state memory array 160 may be programmed per memory page. However, in some embodiments, the voltage threshold for the non-volatile solid-state memory array 160 may be programmed per cell, memory block, or any other unit of memory. MLCs may be associated with multiple voltage thresholds based on the number of levels stored in a cell. For example, a two-level MLC may have three voltage thresholds, one for a Low-page, and two for an Up-page.

The storage device 140 may implement an ATA command set and interface, although other command sets and interfaces may additionally or alternatively be used. In addition to serving commands coming from the host system 130, the controller 150 in one embodiment also services data access requests related to internally-initiated memory operations, such as accesses performed for garbage collection, wear-leveling, or coherency and/or redundancy checking.

Voltage Drift

Figure 2:
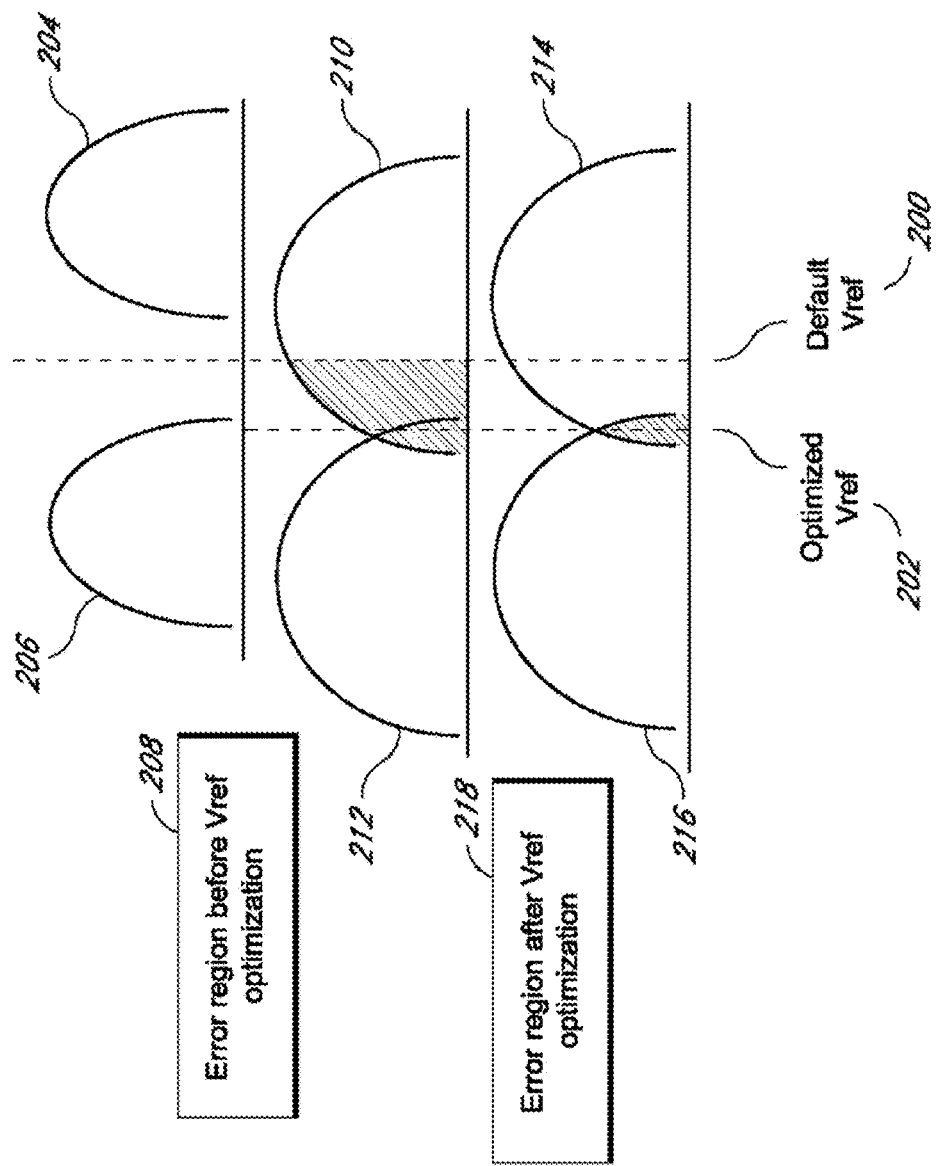
FIG. 2 includes several graphs that show the drifting of voltage in a distribution of memory cells in a storage device over time.

Various factors, including cell failure, program/erase wear, retention limits, read disturb, etc. can contribute to read errors on a flash memory device. The most common read failure is that the voltage stored in a NAND cell crosses the default threshold value that distinguishes it from a neighboring but distinct voltage. FIG. 2 includes several graphs that show the drifting of voltage distributions of memory cells in a storage device over time. The top most graph shows voltage distribution of memory cells of a recently programmed storage device before any of the deteriorating effects have taken place. Note that voltage distributions 204 and 206 can be easily separated by the use of a default reference voltage 200. In other words, the use of default reference voltage 200 with such distributions would not result in reading errors due to an inability to distinguish neighboring voltages. Ideally, a default reference voltage should be in the midpoint of the difference separating two neighboring voltage distributions.

However, over time, some of the above described wear and tear factors result in drifts in the voltage distributions as shown in the distributions 210 and 212 in the middle graph. By now, the two distributions overlap, and cells in that overlap area would be in an error region 208. For those cells, the default reference voltage 200 can no longer be used to distinguish neighboring voltages without errors. Some of those errors may be correctable by ECC, but there will likely be instances where the number of errors may be beyond the ability of ECC to correct.

In the bottom graph, applying embodiments of the invention, an optimized voltage reference 202 is used. By using the optimized voltage reference 202, the error region 218, which represents the total number of bits in error, is much reduced. As a result, the total number of read errors is reduced so that the errors are more likely to be ECC correctable.

Figure 3:
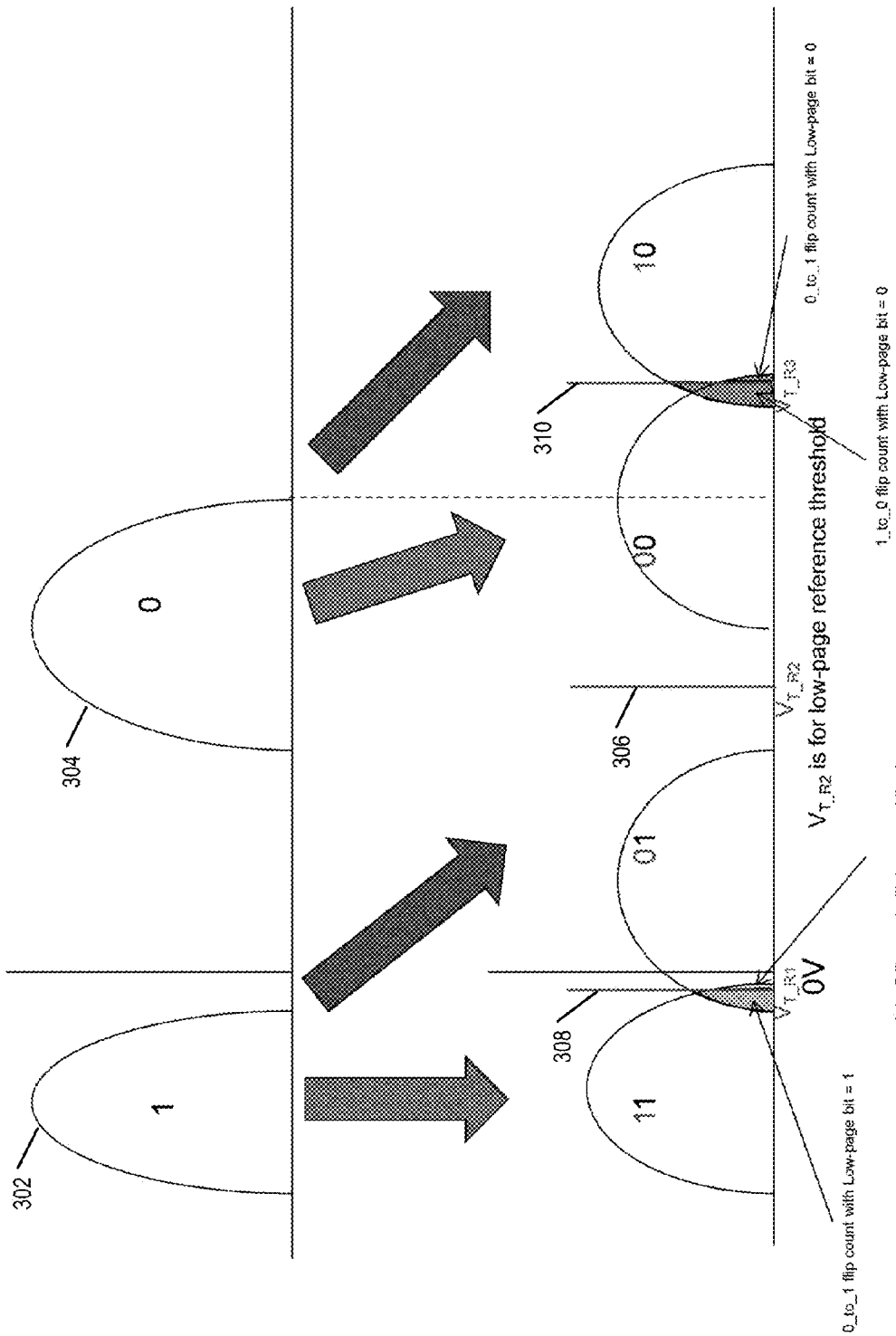
FIG. 3 includes several graphs that show the drifting of voltage in a distribution of multi-level memory cells in a storage device over time.

FIG. 3 includes several graphs that show the drifting of voltage in a distribution of multi-level memory cells in a storage device over time. The graphs illustrate PDFs for a memory cell with a Low-page and an Up-page. As can be seen from the asymmetrical lobes in the figure, the statistical measurements for the cells may differ for one value (e.g., the '1' value) compared to the alternative value (e.g., the '0' value). The arrows denote the transitions from Low-page programming to Up-page programming.

The voltage distribution 302 may represent a '1' value and the voltage distribution 304 may represent a '0' value in a SLC. The division between the '1' value and the '0' value is based on the comparison of an internal voltage value to the voltage threshold set for the non-volatile solid state memory array 160. For a MLC, these distributions may be further divided based on divisions of the voltage thresholds. As illustrated in FIG. 3, a two-level MLC including a Low-page and an Up-page, may have three threshold levels. A first threshold 306 may divide the Low-page between a first value (e.g., '1') and a second value (e.g., '0'). The Up-page may be divided into two values and may be determined by two thresholds—threshold 308 and threshold 310. The first Up-page value (e.g., '0') may be determined as cells having values between threshold 308 and threshold 310 and a second Up-page value (e.g., '1') may be determined as cells having values below threshold 308 or above threshold 310

As the distributions around the thresholds drift, they begin to overlap and enter an error region. Cells in that overlap area would be in an error region around the voltage threshold 308 and the voltage threshold 310. Though not shown, an error region could form around threshold 306 as well. Thus, as with the example described with respect to FIG. 2, some of the bits in the error region may be correctable by ECC, but some may not be correctable.

Error-Minimizing Voltage Thresholds

Figure 4:
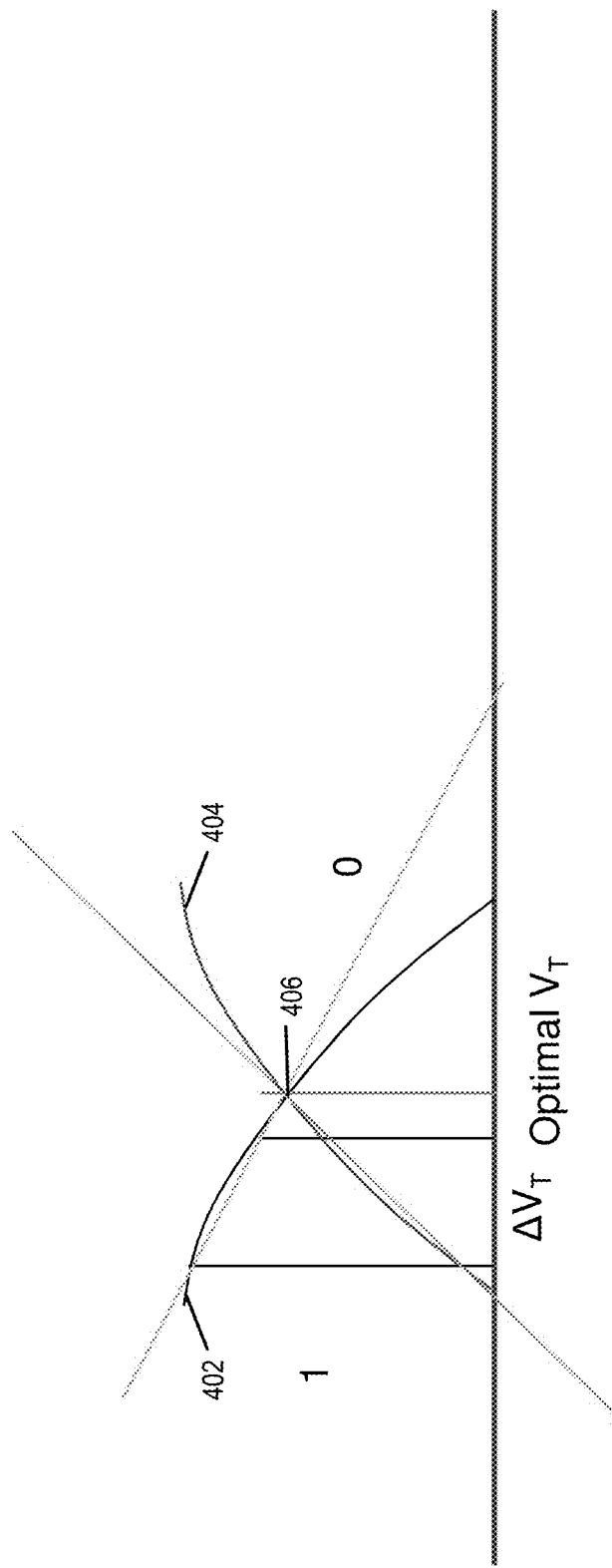
FIG. 4 includes a PDF graph for determining the optimal point for a voltage read threshold.

FIG. 4 includes a PDF graph for determining the optimal point for a voltage read threshold. The PDF graph includes a portion of a PDF 402 for cells that have a '1' value and a portion of a PDF 404 for cells that have a '0' value. The PDF 402 represents the cell distribution, with respect to voltage, of cells most recently programmed with a '1' value, and the PDF 404 represents the cell distribution, with respect to voltage, of cells most recently programmed with a '0' value. As seen from the graph, there is an overlapping area under the PDF 402 and PDF 404 which represents read errors. These read errors include 1→0 errors where a '1' is read as a '0' and 0→1 errors where a '0' is read as a '1'. The intersection point 406 of the PDF 402 and the PDF 404 provides the point of minimum error. Thus, the error-minimizing voltage threshold can be selected to be the voltage at the intersection point 406.

Using PDFs to determine the optimal error-minimizing voltage threshold can, in some cases, be computationally less expensive than prior art methods for determining an error-minimizing voltage threshold because, for example, only three read operations are required. Another method that is more efficient than prior art methods is to use CDFs to determine an error-minimizing voltage threshold. Advantageously, in certain embodiments, using CDFs to determine an error-minimizing voltage threshold for a cell requires only two reads.

Figure 5:
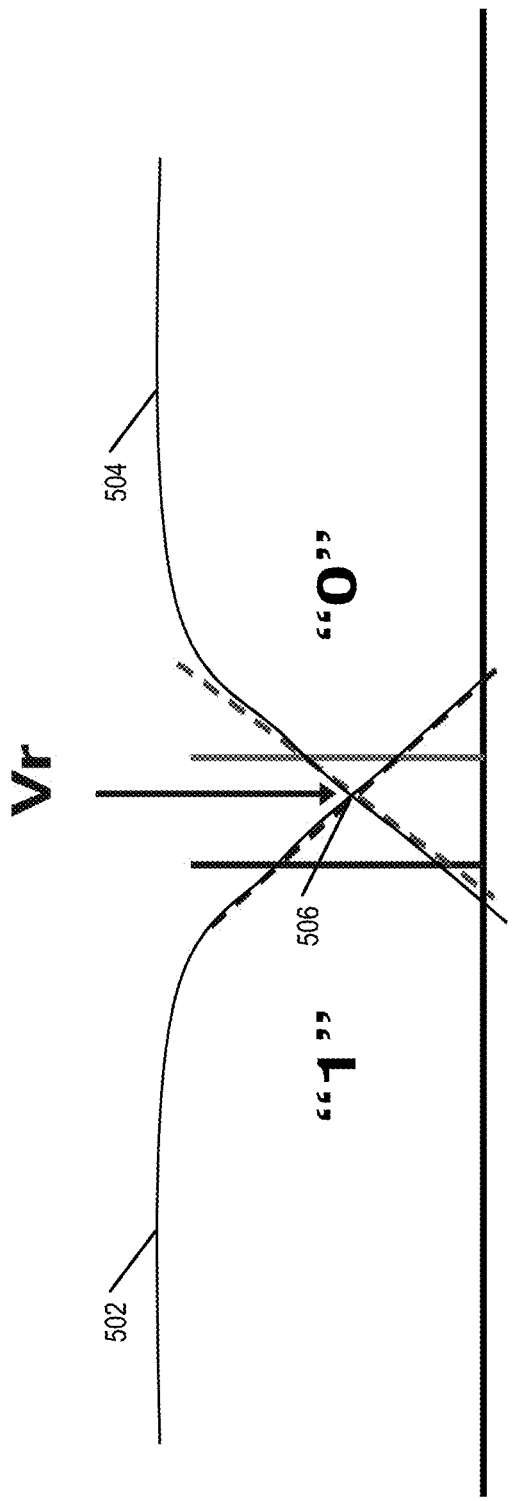
FIG. 5 includes a CDF graph for approximating the optimal point for a voltage read threshold.

FIG. 5 includes a CDF graph for approximating the optimal point for a voltage read threshold. The CDF graph includes a portion of a CDF 502 for cells that have a '1' value and a portion of a CDF 504 for cells that have a '0' value. The CDF 502 represents the cumulative probabilities that the voltage read at all cells within a particular unit of memory (e.g., a page) will be less than or equal to a voltage point on the X-axis associated with a '1' value, and the CDF 504 represents the cumulative probabilities that the voltage read at all cells within the same unit of memory will be greater than or equal to a voltage point on the X-axis associated with a '0' value. As seen from the graph, there is an overlapping area under the CDF 502 and CDF 504, and a Y-value within the area represents the cumulative read errors at that voltage. These read errors include 1→0 errors where a '1' is read as a '0' and 0→1 errors where a '0' is read as a T. The intersection point 506 of the CDF 502 and the CDF 504 provides an approximate the point of minimum error. Thus, by selecting the voltage at the intersection point 506 as the voltage threshold for a set of cells, the number of read errors can be reduced. Advantageously, in certain embodiments, using the intersection of the CDF 502 and CDF 504 to obtain the voltage threshold can be performed significantly faster than prior art methods. Although using the CDF graph of FIG. 5 can be more efficient, in some cases, it may not provide the optimal voltage threshold.

Figure 6:
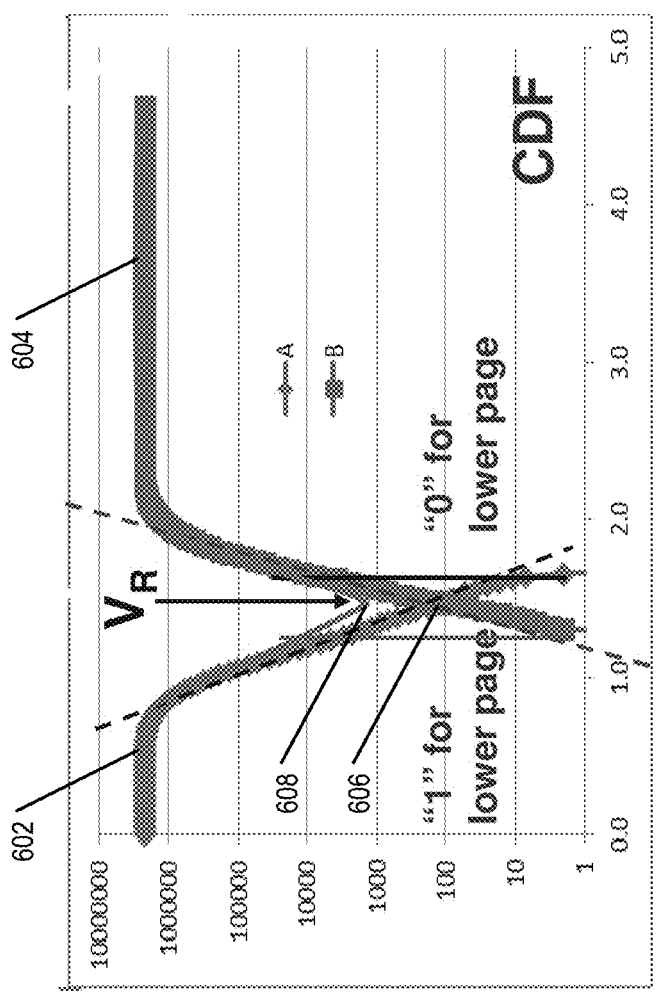
FIG. 6 includes a CDF graph for determining the optimal point for a voltage read threshold.

FIG. 6 includes a CDF graph for determining the optimal point for a voltage read threshold. The CDF graph includes a portion of a CDF 602 for cells that have a '1' value and a portion of a CDF 604 for cells that have a '0' value. The CDF 602 represents the cumulative probabilities that the voltage read at all cells within a particular unit of memory (e.g., a page) will be less than or equal to a voltage point on the X-axis associated with a '1' value, and the CDF 604 represents the cumulative probabilities that the voltage read at all cells within the same unit of memory will be greater than or equal to a voltage point on the X-axis associated with a '0' value. As seen from the graph, there is an overlapping area under the CDF 602 and CDF 604, and a Y-value within the area represents the cumulative read errors at that voltage. These read errors include 1→0 errors where a '1' is read as a '0' and 0→1 errors where a '0' is read as a '1'. As with the intersection point 506, the intersection point 606 of the CDF 602 and the CDF 604 provides an approximate the point of minimum error. To obtain the optimal point for the voltage read threshold, a summation point 608 can be identified from the CDF 602 and the CDF 604 that provides the minimum error. This summation point 608 is the point where the sum of the 1→0 errors and the 0→1 errors is minimum. In some cases, the voltage at the summation point 608 provides the optimal threshold voltage for the cells of a memory page. Advantageously, in some embodiments, determining the intersection point of the CDFs is faster than calculating the optimal voltage threshold. However, in some embodiments, determining the summation point that is minimal for the CDFs provides a more accurate optimal voltage threshold than determining the intersection point.

Example of a Low-Page Voltage Threshold Determination Process

Figure 7:
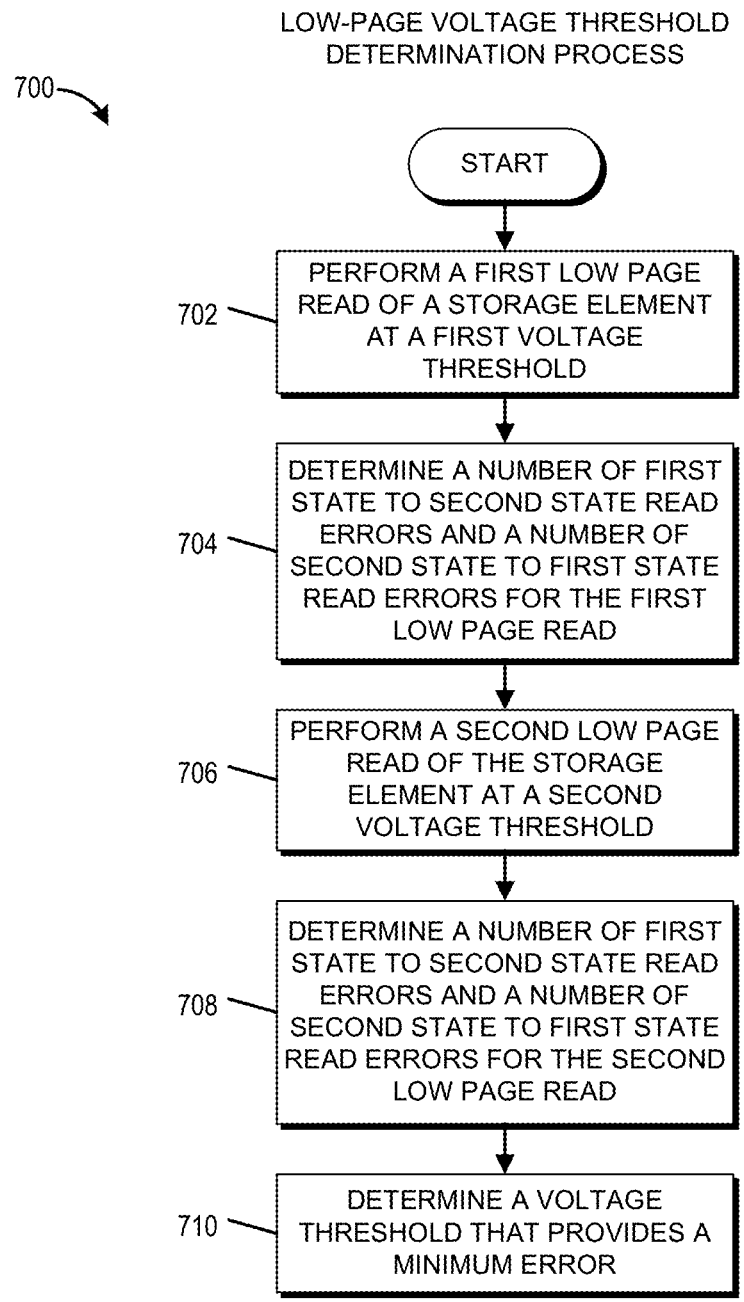
FIG. 7 is a flow diagram illustrating a Low-page voltage threshold determination process.

FIG. 7 is a flow diagram illustrating a Low-page voltage threshold determination process 700. Generally, the process 700 determines the optimal voltage threshold for a Low-page in a MLC, which may then be used to modify a programmed voltage threshold for distinguishing between two states in a cell (e.g., (a '1' state and a '0' state). However, the process 700 may also be used to find the optimal voltage threshold in a SLC. The process 700 may be performed in response to a user command, at a specified time interval (e.g., once a month), in response to a number of read errors and/or a number of unrecoverable read errors satisfying a threshold, or in response to any other trigger that may cause the process 700 to be performed. Although not limited as such, the process 700 may be performed, in whole or in part, by the controller 150, the processor 120, the voltage threshold calculation module 122, and the ECC module 152.

The process begins at block 702 where, for example, the voltage threshold calculation module 122 performs a first Low-page read of a storage element (e.g., a page of the non-volatile solid state memory array 160) at a first voltage threshold. In some cases, the block 702 may include reading the voltage values of cells in a page of the non-volatile solid state memory array 160. However, generally, the voltage value of cells in the non-volatile solid state memory array 160 cannot be read. Instead, reading the cells or a page of the non-volatile solid state memory array 160 results in receiving a comparison result comparing the voltage stored in each cell to the voltage threshold for the page being read. In such cases, if it is determined that a read voltage is below a voltage threshold, a first state value (e.g., a '0') may be returned, and if it is determined that the read voltage is above a voltage threshold, a second state value (e.g., a '1') may be returned. If the two voltages are equivalent, the non-volatile solid state memory array 160 can treat the cell as being in either the first state or the second state based on the configuration of the non-volatile solid state memory array 160.

At block 704, the voltage threshold calculation module 122 determines a number of first state to second state read errors (e.g., '0' to '1' read errors) and a number of second state to first state read errors (e.g., '1' to '0' read errors) for the first Low-page read. In some embodiments, these read errors may be determined by using an ECC process performed by the ECC module 152.

The voltage threshold calculation module 122 performs a second Low-page read of the storage element at a second voltage threshold at block 706. At block 708, the voltage threshold calculation module 122 determines a number of first state to second state read errors and a number of second state to first state read errors for the second Low-page read. As with block 704, the voltage threshold calculation module 122 may use the ECC module 152 to determine the read errors.

At block 710, the voltage threshold calculation module 122 determines a voltage threshold that provides a minimum error. The controller 150 can then program the non-volatile solid state memory array 160, or a page corresponding to the page read at the blocks 704 and 706, to use the voltage threshold determines at the block 710 as its voltage threshold when determining whether a voltage programmed for a cell is in a first state or a second state.

As previously described, the voltage threshold that provides the minimum error can be determined based on the intersection of the PDFs for 1→0 and 0→1 errors or the voltage where the summation of the CDFs for 1→0 and 0→1 errors is minimum. Further, in some cases, the voltage threshold that provides the minimum error can be estimated based on the intersection of the CDFs for 1→0 and 0→1 errors.

The PDFs and the CDFs can be represented as linear equations in the log domain in the intersection area. The optimal voltage threshold can be determined based on the intersection of these linear equations, or the point where the summation is minimum. For instance, for the CDF, the equations for the errors after a first Low-page read at a first voltage threshold can be represented as follows:

$$\ln(Y_{11}) = A_1 + B_1 V_{T1} \quad (1)$$

$$\ln(Y_{12}) = A_2 + B_2 V_{T1} \quad (2)$$

In equations (1) and (2), $Y_{11}$ represents errors of a first type (e.g., 0→1 read errors) obtained at a first voltage threshold, $V_{T1}$, and $Y_{12}$ represents errors of a second type (e.g., 0→1 read errors) obtained at the first voltage threshold. Each of the equations also include a pair of coefficients, $A_1$ and $B_1$ for equation (1), and $A_2$ and $B_2$ for equation (2). These two equations can be derived from the processes associated with the blocks 702 and 704. A similar pair of equations can be derived from the processes associated with the blocks 706 and 708 as follows:

$$\ln(Y_{21}) = A_1 + B_1 V_{T2} \quad (3)$$

$$\ln(Y_{22}) = A_2 + B_2 V_{T2} \quad (4)$$

In equations (3) and (4), $Y_{21}$ represents errors of the first type, errors of the same type as $Y_{11}$, obtained at a second voltage threshold, $V_{T2}$, and $Y_{22}$ represents errors of the second type, errors of the same type as $Y_{12}$, obtained at the second voltage threshold. Further, as with equation (1), equation (3) includes the $A_1$ and $B_1$ coefficient pair and, as with equation (2), equation (4) includes the $A_2$ and $B_2$ coefficient pair.

Equations (1) and (3) can then be combined via addition or subtraction to determine the value for the coefficient pair $A_1$ and $B_1$. Similarly, equations (2) and (4) can then be combined via addition or subtraction to determine the value for the coefficient pair, $A_2$ and $B_2$. Once the coefficients have been determined, we can obtain a linear equation for errors of the first type, equation (5), and a linear equation for errors of the second type, equation (6).

$$\ln(Y_1) = A_1 = B_1 V_T \quad (5)$$

$$\ln(Y_2) = A_2 = B_2 V_T \quad (6)$$

These equations can then be summed and solved to determine the threshold voltage, $V_T$, where the total error, Y, which is the sum of the errors of the first type and the second type, is minimum. This process is represented by equation (7).

$$Y = Y_1 + Y_2 = e^{A_1 + B_1 V_T} + e^{A_2 + B_2 V_t} \quad (7)$$

The minimum error is then the point where the derivative of the error, Y', is 0. Thus, the optimal error-minimizing threshold voltage can be solved based on the derivative of equation (7), which gives equation (8) below.

$$V_T = \frac{1}{(B1 - B2)} \left\{ \ln\left(\frac{-B2}{B1}\right) + A2 - A1 \right\} \quad (8)$$

Example Voltage Threshold Calculation Selection Process

Figure 8:
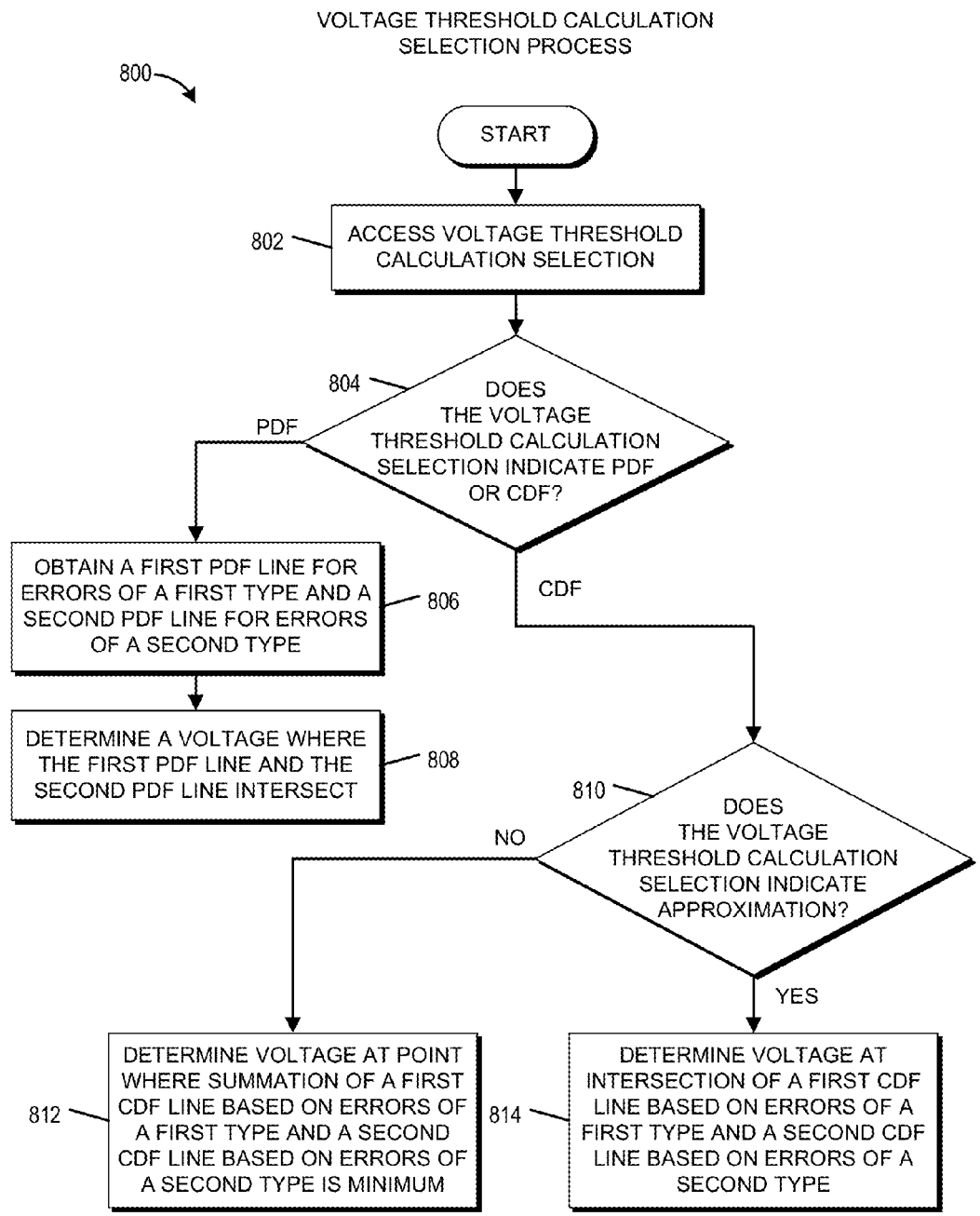
FIG. 8 is a flow diagram illustrating a voltage threshold calculation selection process.

FIG. 8 is a flow diagram illustrating a voltage threshold calculation selection process 800. Generally, the process 800 determines the process to be used for determining the error-minimizing voltage threshold. The process 800 may be performed in response to a user command, at a specified time interval (e.g., once a month), in response to a number of read errors and/or a number of unrecoverable read errors satisfying a threshold, or in response to any other trigger that may cause the process 800 to be performed. Although not limited as such, the process 800 may be performed, in whole or in part, by the controller 150, the processor 120, the voltage threshold calculation module 122, and the ECC module 152.

The process 800 begins at block 802 where, for example, the voltage threshold calculation module 122 accesses a voltage threshold calculation selection. This selection may be provided by a user, stored in a memory associated with the controller, or stored in a register associated with the non-volatile solid state memory array 160.

At decision block 804, the voltage threshold calculation module 122 determines whether the voltage threshold calculation selection indicates to determine the error-minimizing voltage threshold using PDFs or CDFs. If the selection indicates to use a PDF, the voltage threshold calculation module 122 obtains a first PDF line for errors of a first type and a second PDF line for errors of a second type at block 806. Obtaining these lines can include performing the processes of the blocks 702-708 from the process 700. Further, to obtain the PDF lines, a third low-page read may be performed at a third voltage threshold. In other words, the processes associated with the blocks 702 and 704 may be performed for two different voltage thresholds. At block 808, the voltage threshold calculation module 122 determines a voltage where the first PDF line and the second PDF line intersect, as illustrated in FIG. 4 as intersection point 406.

If the selection indicates at decision block 804 to use a CDF, the voltage threshold calculation module 122 determines at decision block 810 whether the voltage threshold calculation selection indicates to determine an approximation of the error-minimizing voltage threshold. If so, the voltage threshold calculation module 122 determines the voltage at an intersection of a first CDF line based on errors of a first type and a second CDF line based on errors of a second type at block 814. These CDF lines may be determined using the process 700.

If the voltage threshold calculation selection indicates to determine the optimal the error-minimizing voltage threshold, the voltage threshold calculation module 122 determines the voltage at the point where the summations of a first CDF line based on errors of a first type and a second CDF line based on errors of a second type is minimum. This determination may be made using the process 700 and the previously described equations (1)-(8).

Although primarily described with respect to the Low-page, or an SLC, in certain embodiments, the process 800 may also be used with respect to an MLC, which may include an Up-page, or additional voltage divisions.

Example of a Up-Page Voltage Threshold Determination Process

Figure 9:
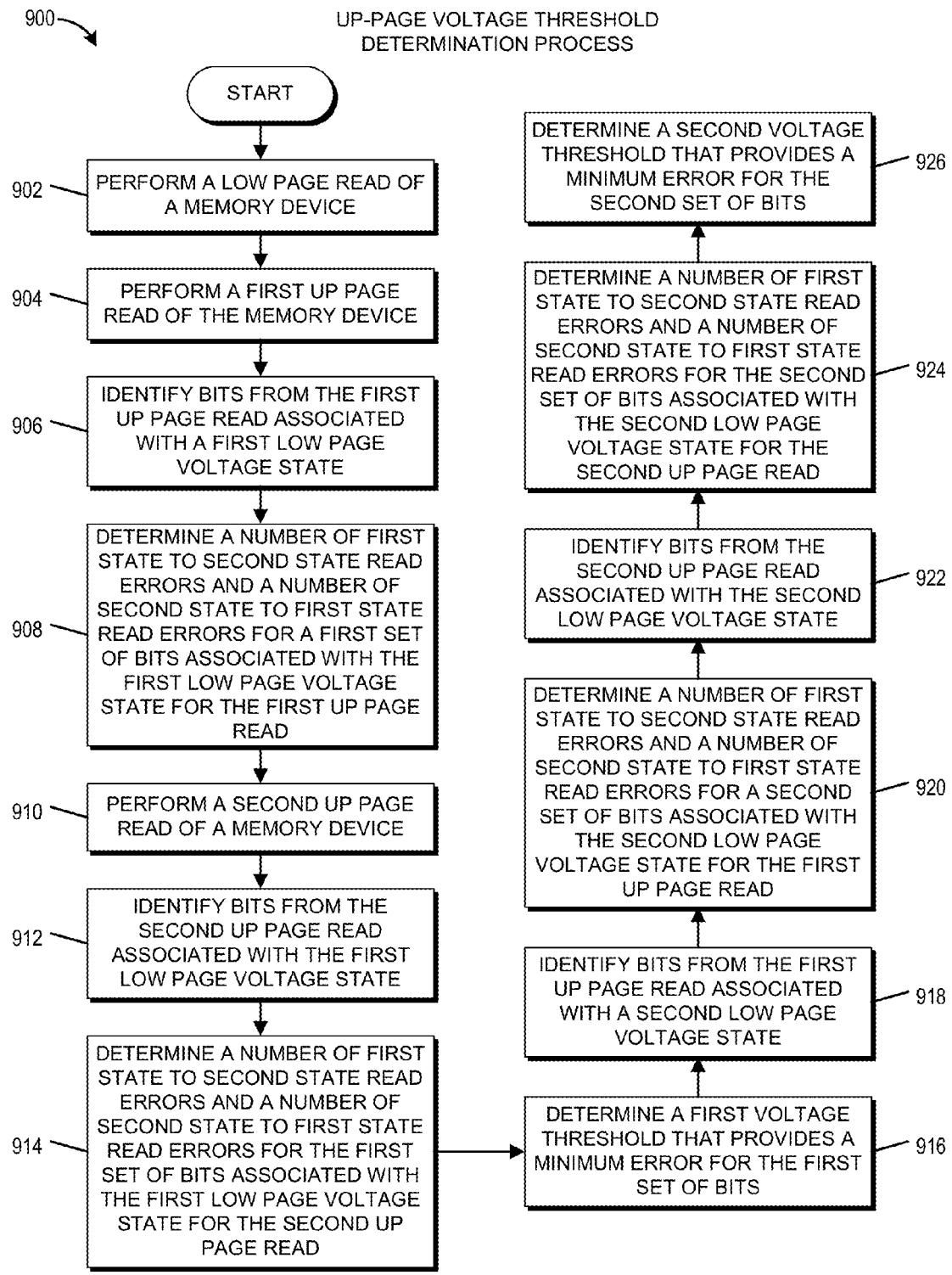
FIG. 9 is a flow diagram illustrating an Up-page voltage threshold determination process.

FIG. 9 is a flow diagram illustrating an Up-page voltage threshold determination process 900. Generally, the process 900 determines the optimal voltage threshold for an Up-page in a MLC, which may then be used to modify a programmed voltage threshold for distinguishing between two states in a cell (e.g., (a '1' state and a '0' state). The process 900 may be performed in response to a user command, at a specified time interval (e.g., once a month), in response to a number of read errors and/or a number of unrecoverable read errors satisfying a threshold, or in response to any other trigger that may cause the process 700 to be performed. Although not limited as such, the process 900 may be performed, in whole or in part, by the controller 150, the processor 120, the voltage threshold calculation module 122, and the ECC module 152.

The process begins at block 902 where, for example, the voltage threshold calculation module 122 performs a Low-page read of a storage element, or memory device (e.g., a page of the non-volatile solid state memory array 160). In some embodiments, a single Low-page read is performed as part of the process 900. In other embodiments, multiple Low-page reads may be performed. The goal is to decode the Low-page at block 902 before going to block 904.

At block 904, the voltage threshold calculation module 122 performs a first Up-page read of the memory device. In some embodiments, the block 904 can include decoding of the Up-page read. Once decoded, the process 900 transitions to block 906. In some embodiments, multiple reads may be needed for a successful decoding in block 904.

The voltage threshold calculation module 122 identifies bits from the first Up-page read that are associated with a first Low-page voltage state at block 906 to obtain a first set of bits. For example, the voltage threshold calculation module 122 may identify bits from the first Up-page read that are associated with a '1 Low-page state. At block 908, the voltage threshold calculation module 122 determines a number of first state to second state read errors (e.g., 0→1 read errors) and a number of second state to first state read errors (e.g., 1→0 read errors) for the first set of bits associated with the first Low-page voltage state (e.g., a '1 state) for the first Up-page read. For example, the first set of bits may be bits with Low-page values to the left of the first threshold 306 in the graph of FIG. 3. As with the process 700 (e.g., block 704), the voltage threshold calculation module 122 may use the ECC module 152 to determine the read errors using an ECC process.

At block 910, the voltage threshold calculation module 122 performs a second Up-page read of a memory device. If multiple reads were performed at block 904, this block can be omitted. In such cases, any one of the multiple reads at block 904 not used as the first Up-page read could be used as this second Up-page read. As previously mentioned, in some cases, a second Low-page read may also be performed to facilitate performing the block 912. In other cases, the block 912 may rely on the Low-page read performed at the block 902. At block 912, the voltage threshold calculation module 122 identifies bits from the second Up-page read associated with the first Low-page voltage state.

At block 914, the voltage threshold calculation module 122 determines a number of first state to second state read errors and a number of second state to first state read errors for the first set of bits associated with the first Low-page voltage state for the second Up-page read. The voltage threshold calculation module 122, at block 916, determines a first voltage threshold that provides a minimum error for the first set of bits. The block 916 can include one or more of the embodiments described with respect to the block 710. Thus, for example, the first voltage threshold may be determined using a pair of CDF lines and solving the equations (1)-(8) described above. Once the first voltage threshold that provides the minimum error for the first set of bits is determined, the voltage threshold calculation module 122 may configure the non-volatile solid state memory array 160 based on the first voltage threshold. This first voltage threshold may, for example, be the second threshold 308 from FIG. 3.

At block 918, the voltage threshold calculation module 122 identifies bits from the first Up-page read associated with a second Low-page voltage state to obtain a second set of bits. For example, the second set of bits may be bits with Low-page values to the right of the first threshold 306 in the graph of FIG. 3. At block 920, the voltage threshold calculation module 122 determines a number of first state to second state read errors and a number of second state to first state read errors for the second set of bits associated with the second Low-page voltage state for the first Up-page read.

The voltage threshold calculation module 122, at block 922, identifies bits from the second Up-page read associated with the second Low-page voltage state. At block 924, the voltage threshold calculation module 122 determines a number of first state to second state read errors and a number of second state to first state read errors for the second set of bits associated with the second Low-page voltage state for the second Up-page read. The voltage threshold calculation module 122 determines a second voltage threshold that provides a minimum error for the second set of bits at block 926. As with the block 916, the block 926 can include performing any of the previously described processes for obtaining the second voltage threshold that provides the minimum error. This second voltage threshold may, for example, be the third threshold 310 from FIG. 3. Further, once the second voltage threshold that provides the minimum error for the second set of bits is determined, the voltage threshold calculation module 122 may configure the non-volatile solid state memory array 160 based on the second voltage threshold.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 7, 8, and 9 may differ from those shown in the figures. Depending on the embodiment, certain of the steps described in the example above may be removed, others may be added, and the sequence of steps may be altered and/or performed in parallel. Although this disclosure describes examples in which data are stored in groups of blocks termed superblocks, those skilled in the art will recognize that the various embodiments disclosed are applicable to systems with other memory measurement units such as planes, blocks, pages, sectors, etc. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for determining voltage thresholds in a memory device of a non-volatile memory array, the memory device comprising one or more memory cells, the method comprising:

performing a first read operation of the memory device using a first voltage threshold to obtain a first plurality of values;

identifying, in the first plurality of values, a first number of bit errors of a first type and a first number of bit errors of a second type;

performing a second read operation of the memory device using a second voltage threshold to obtain a second plurality of values, the second voltage threshold being different from the first voltage threshold;

identifying, in the second plurality of values, a second number of bit errors of the first type and a second number of bit errors of the second type;

performing a first linear interpolation process based on the first and second number of bit errors of the first type, the first voltage threshold, and the second voltage threshold;

performing a second linear interpolation process based on the first and second number of bit errors of the second type, the first voltage threshold, and the second voltage threshold; and determining an error-minimizing voltage threshold that reduces bit errors during reads of the memory device based, at least in part, on the first linear interpolation process and the second linear interpolation process, wherein the method is performed under control of a controller.

2. The method of claim 1, further comprising setting a reference value of the memory device to the error-minimizing voltage threshold.

3. The method of claim 2, wherein each memory cell of the memory device comprises a single-level cell with one state selection threshold, the one state selection threshold set to the reference value.

4. The method of claim 2, wherein each memory cell of the memory device comprises a multi-level cell with at least three state selection thresholds, and wherein a first state selection threshold of the at least three state selection thresholds comprises the reference value and is associated with a Low-page for the memory device, and a second state selection threshold and a third state selection threshold of the at least three state selection thresholds are associated with an Up-page for the memory device.

5. The method of claim 1,
wherein the first linear interpolation process is associated with a first cumulative distribution function and the second linear interpolation process is associated with a second cumulative distribution function, and
wherein determining the error-minimizing voltage threshold comprises determining an approximation of the error-minimizing voltage threshold by determining an intersection of the first cumulative distribution function based on the first and second number of bit errors of the first type, and the second cumulative distribution function based on the first and second number of bit errors of the second type.

6. The method of claim 1,
wherein the first linear interpolation process is associated with a first cumulative distribution function and the second linear interpolation process is associated with a second cumulative distribution function, and
wherein determining the error-minimizing voltage threshold comprises determining a voltage point where a summation of bit errors of the first type and bit errors of the second type is minimum based on the first cumulative distribution function based on the first and second number of bit errors of the first type, and the second cumulative distribution function based on the first and second number of bit errors of the second type.

7. The method of claim 1, wherein:
identifying the first numbers of bit errors of the first and second types comprises using an Error-Correcting Code (ECC) process on the first plurality of values to identify a number of bits set to a first state that should be set to a second state and a number of bits set to the second state that should be set to the first state; and
identifying the second numbers of bit errors of the first and second types comprises using the ECC process on the second plurality of values to identify a number of bits set to the first state that should be set to the second state and a number of bits set to the second state that should be set to the first state.

8. A method for determining voltage thresholds in a memory device of a non-volatile memory array, the memory device comprising one or more memory cells, the method comprising:

performing a Low-page read operation of the memory device using a Low-page voltage reference threshold to obtain a first plurality of values;

performing a first Up-page read operation of the memory device using a first voltage threshold and a second voltage threshold to obtain a second plurality of values;

identifying, in a first subset of bits of the second plurality of values, a first number of bit errors of a first type and a first number of bit errors of a second type, wherein the first subset of bits of the second plurality of values are identified based on corresponding bits of the first plurality of values that are set to a first state;

identifying, in a second subset of bits of the second plurality of values, a second number of bit errors of the first type and a second number of bit errors of the second type, wherein the second subset of bits of the second plurality of values are identified based on corresponding bits of the first plurality of values that are set to a second state;

performing a second Up-page read operation of the memory device using a third voltage threshold and a fourth voltage threshold to obtain a third plurality of values;

identifying, in a first subset of bits of the third plurality of values, a third number of bit errors of the first type and a third number of bit errors of the second type, wherein the first subset of bits of the third plurality of values are identified based on corresponding bits of the first plurality of values that are set to the first state;

identifying, in a second subset of bits of the third plurality of values, a fourth number of bit errors of the first type and a fourth number of bit errors of the second type, wherein the second subset of bits of the third plurality of values are identified based on corresponding bits of the first plurality of values that are set to the second state;

performing a first linear interpolation process based on the first voltage threshold, the first number of bit errors of the first type, the first number of bit errors of the second type, the third voltage threshold, the third number of bit errors of the first type, and the third number of bit errors of the second type;

determining a first error-minimizing voltage threshold that reduces bit errors in the first subset of bits of the second plurality of values and the first subset of bits of the third plurality of values during reads of the memory device based, at least in part, on the first linear interpolation process; and determining a second error-minimizing voltage threshold that reduces bit errors in the second subset of bits of the second plurality of values and the second subset of bits of the third plurality of values during reads of the memory device based, at least in part, on the second voltage threshold, the second number of bit errors of the first type, the second number of bit errors of the second type, the fourth voltage threshold, the fourth number of bit errors of the first type, and the fourth number of bit errors of the second type, wherein the method is performed under control of a controller.

9. The method of claim 8, further comprising, at least one of:

setting a first reference value of the memory device to the first error-minimizing voltage threshold; or setting a second reference value of the memory device to the second error-minimizing voltage threshold.

10. The method of claim 8, wherein:

identifying the first numbers of bit errors of the first and second types comprises using an Error-Correcting Code (ECC) process on the second plurality of values to identify a number of bits from the first subset of bits of the second plurality of values set to the first state that should be set to the second state and a number of bits from the first subset of bits of the second plurality of values set to the second state that should be set to the first state;

identifying the second numbers of bit errors of the first and second types comprises identifying a number of bits from the second subset of bits of the second plurality of values set to the first state that should be set to the second state and a number of bits from the second subset of bits of the second plurality of values set to the second state that should be set to the first state based on the ECC process used on the second plurality of values;

identifying the third numbers of bit errors of the first and second types comprises using the ECC process on the third plurality of values to identify a number of bits from the first subset of bits of the third plurality of values set to the first state that should be set to the second state and a number of bits from the first subset of bits of the third plurality of values set to the second state that should be set to the first state; and identifying the fourth numbers of bit errors of the first and second types comprises identifying a number of bits from the second subset of bits of the third plurality of values set to the first state that should be set to the second state and a number of bits from the second subset of bits of the third plurality of values set to the second state that should be set to the first state based on the ECC process used on the third plurality of values.

11. The method of claim 8, wherein determining the second error-minimizing voltage threshold comprises performing a second linear interpolation process.

12. The method of claim 11, wherein:

determining the first error-minimizing voltage threshold further comprises determining an approximation of the first error-minimizing voltage threshold by determining an intersection of a first cumulative distribution function based on the first and third number of bit errors of the first type, and a second cumulative distribution function based on the first and third number of bit errors of the second type, wherein the first cumulative distribution function and the second cumulative distribution function are based on the first linear interpolation process; and determining the second error-minimizing voltage threshold further comprises determining an approximation of the second error-minimizing voltage by determining an intersection of a third cumulative distribution function based on the second and fourth number of bit errors of the first type, and a fourth cumulative distribution function based on the second and fourth number of bit errors of the second type, wherein the third cumulative distribution function and the fourth cumulative distribution function are based on the second linear interpolation process.

13. The method of claim 11, wherein:

determining the first error-minimizing voltage threshold further comprises determining a first voltage point where a first summation of bit errors of the first type and bit errors of the second type is minimum based on a first cumulative distribution function based on the first and third number of bit errors of the first type, and a second cumulative distribution function based on the first and third number of bit errors of the second type, wherein the first cumulative distribution function and the second cumulative distribution function are based on the first linear interpolation process; and determining the second error-minimizing voltage threshold further comprises determining a second voltage point where a second summation of bit errors of the first type and bit errors of the second type is minimum based on a third cumulative distribution function based on the second and fourth number of bit errors of the first type, and a fourth cumulative distribution function based on the second and fourth number of bit errors of the second type, wherein the third cumulative distribution function and the fourth cumulative distribution function are based on the second linear interpolation process.

14. A storage device comprising:

a non-volatile memory array comprising solid state memory devices capable of being programmed with threshold values for performing read operations, each solid state memory device comprising one or more memory cells; and a controller configured to read data from the non-volatile memory array, the controller further configured to:

perform a first read operation of a memory device from the solid state memory devices using a first voltage threshold to obtain a first plurality of values;

identify, in the first plurality of values, a first number of bit errors of a first type and a first number of bit errors of a second type;

perform a second read operation of the memory device using a second voltage threshold to obtain a second plurality of values, the second voltage threshold being different from the first voltage threshold;

identify, in the second plurality of values, a second number of bit errors of the first type and a second number of bit errors of the second type; and determine an error-minimizing voltage threshold that reduces bit errors during reads of the memory device by performing a linear interpolation process, the linear interpolation process being based, at least in part, on the first voltage threshold, the first number of bit errors of the first type, the first number of bit errors of the second type, the second voltage threshold, the second number of bit errors of the first type, and the second number of bit errors of the second type.

15. The storage device of claim 14, wherein the controller is further configured to set a reference value of the memory device to the error-minimizing voltage threshold.

16. The storage device of claim 15, wherein each memory cell of the memory device comprises a single-level cell with one state selection threshold, the one state selection threshold set to the reference value.

17. The storage device of claim 14, wherein the controller comprises an Error-Correcting Code (ECC) module and wherein the controller is further configured to:
- identify the first numbers of bit errors of the first and second types in the first plurality of values by using the ECC module to identify a number of bits of the first plurality of values set to a first state that should be set to a second state and a number of bits of the first plurality of values set to the second state that should be set to the first state; and
- identify the second numbers of bit errors of the first and second types in the second plurality of values by using the ECC module to identify a number of bits of the second plurality of values set to the first state that should be set to the second state and a number of bits of the second plurality of values set to the second state that should be set to the first state.

18. The storage device of claim 14, wherein the controller is configured to determine the error-minimizing voltage threshold by determining an approximation of the error-minimizing voltage threshold by determining an intersection of a first cumulative distribution function based on the first and second number of bit errors of the first type, and a second cumulative distribution function based on the first and second number of bit errors of the second type, wherein the first cumulative distribution function and the second cumulative distribution function are based on the linear interpolation process.

19. The storage device of claim 14, wherein the controller is configured to determine the error-minimizing voltage threshold by determining a voltage point where a summation of bit errors of the first type and bit errors of the second type is minimum based on a first cumulative distribution function based on the first and second number of bit errors of the first type, and a second cumulative distribution function based on the first and second number of bit errors of the second type, wherein the first cumulative distribution function and the second cumulative distribution function are based on the linear interpolation process.

20. The storage device of claim 14, wherein the controller comprises a voltage threshold calculation module configured to perform the linear interpolation process to determine the error-minimizing voltage threshold.

21. A storage device comprising:
- a non-volatile memory array comprising solid state memory devices capable of being programmed with threshold values for performing read operations, each solid state memory device comprising one or more memory cells, the one or more memory cells comprising multi-level cells including a Low-page and an Up-page; and
- a controller configured to read data from the non-volatile memory array, the controller further configured to:
  - perform a Low-page read operation of a memory device from the solid state memory devices using a Low-page voltage threshold to obtain a first plurality of values;
  - perform a first Up-page read operation of the memory device using a first voltage threshold and a second voltage threshold to obtain a second plurality of values;
  - identify, in a first subset of bits of the first plurality of values, a first number of bit errors of a first type and a first number of bit errors of a second type, wherein the first subset of bits of the second plurality of values are identified based on corresponding bits of the first plurality of values that are set to a first state;
  - identify, in a second subset of bits of the second plurality of values, a second number of bit errors of the first type and a second number of bit errors of the second type, wherein the second subset of bits of the second plurality of values are identified based on corresponding bits of the first plurality of values that are set to a second state;
  - perform a second Up-page read operation of the memory device using a third voltage threshold and a fourth voltage threshold to obtain a third plurality of values;
  - identify, in a first subset of bits of the third plurality of values, a third number of bit errors of the first type and a third number of bit errors of the second type, wherein the first subset of bits of the third plurality of values are identified based on corresponding bits of the first plurality of values that are set to the first state;
  - identify, in a second subset of bits of the third plurality of values, a fourth number of bit errors of the first type and a fourth number of bit errors of the second type, wherein the second subset of bits of the third plurality of values are identified based on corresponding bits of the first plurality of values that are set to the second state;
  - perform a first linear interpolation process based on the first voltage threshold, the first number of bit errors of the first type, the first number of bit errors of the second type, the third voltage threshold, the third number of bit errors of the first type, and the third number of bit errors of the second type;
  - determine a first error-minimizing voltage threshold that reduces bit errors in the first subset of bits of the second plurality of values and the first subset of bits of the third plurality of values during reads of the memory device based, at least in part, on the first linear interpolation process; and
  - determine a second error-minimizing voltage threshold that reduces bit errors in the second subset of bits of the second plurality of values and the second subset of bits of the third plurality of values during reads of the memory device based, at least in part, on the second voltage threshold, the second number of bit errors of the first type, the second number of bit errors of the second type, the fourth voltage threshold, the fourth number of bit errors of the first type, and the fourth number of bit errors of the second type.

22. The storage device of claim 21, wherein the controller is further configured to perform at least one of:
- setting a first reference value of the memory device to the first error-minimizing voltage threshold; or
- setting a second reference value of the memory device to the second error-minimizing voltage threshold.

23. The storage device of claim 21, wherein the controller comprises an Error-Correcting Code (ECC) module and wherein the controller is further configured to:
- identify the first numbers of bit errors of the first and second types by using the ECC module to identify a number of bits from the first subset of bits of the second plurality of values set to the first state that should be set to the second state and a number of bits from the first subset of bits of the second plurality of values set to the second state that should be set to the first state;

identify the second numbers of bit errors of the first and second types by using the ECC module to identify a number of bits from the second subset of bits of the second plurality of values set to the first state that should be set to the second state and a number of bits from the second subset of bits of the second plurality of values set to the second state that should be set to the first state;

identify the third numbers of bit errors of the first and second types by using the ECC module to identify a number of bits from the first subset of bits of the third plurality of values set to the first state that should be set to the second state and a number of bits from the first subset of bits of the third plurality of values set to the second state that should be set to the first state; and identify the fourth numbers of bit errors of the first and second types by using the ECC module to identify a number of bits from the second subset of bits of the third plurality of values set to the first state that should be set to the second state and a number of bits from the second subset of bits of the third plurality of values set to the second state that should be set to the first state.

24. The storage device of claim 21, wherein the controller is configured to determine the second error-minimizing voltage threshold by performing a second linear interpolation process.

25. The storage device of claim 24, wherein:

the first linear interpolation process comprises determining an intersection of a first cumulative distribution function based on the first and third number of bit errors of the first type, and a second cumulative distribution function based on the first and third number of bit errors of the second type; and the second linear interpolation process comprises determining an intersection of a third cumulative distribution function based on the second and fourth number of bit errors of the first type, and a fourth cumulative distribution function based on the second and fourth number of bit errors of the second type.

26. The storage device of claim 24, wherein:

the first linear interpolation process comprises determining a first voltage point where a first summation of bit errors of the first type and bit errors of the second type is minimum based on a first cumulative distribution function based on the first and third number of bit errors of the first type, and a second cumulative distribution function based on the first and third number of bit errors of the second type; and the second linear interpolation process comprises determining a second voltage point where a second summation of bit errors of the first type and bit errors of the second type is minimum based on a third cumulative distribution function based on the second and fourth number of bit errors of the first type, and a fourth cumulative distribution function based on the second and fourth number of bit errors of the second type.

27. The storage device of claim 24, wherein the controller comprises a voltage threshold calculation module configured to perform the first linear interpolation process to determine the first error-minimizing voltage threshold and to perform the second linear interpolation process to determine the second error-minimizing voltage threshold.

* * * * *